(12) United States Patent
Gazit

(10) Patent No.: US 8,994,521 B2
(45) Date of Patent: Mar. 31, 2015

(54) STEERING WHEELS FOR VEHICLE CONTROL IN MANUAL AND AUTONOMOUS DRIVING

(75) Inventor: Ran Y Gazit, Ra'anana (IL)

(73) Assignee: GM Global Technology Operations LLC, Detroit, MI (US)

( * ) Notice: Subject to any disclaimer, the term of this patent is extended or adjusted under 35 U.S.C. 154(b) by 746 days.

(21) Appl. No.: 13/171,580

(22) Filed: Jun. 29, 2011

(65) Prior Publication Data

US 2013/0002416 A1 Jan. 3, 2013

(51) Int. Cl.
*B60Q 1/00* (2006.01)
*B62D 5/00* (2006.01)
*B62D 1/28* (2006.01)
*B62D 15/02* (2006.01)

(52) U.S. Cl.
CPC *B62D 5/001* (2013.01); *B62D 1/28* (2013.01); *B62D 1/286* (2013.01); *B62D 15/025* (2013.01); *B62D 15/0255* (2013.01); *B62D 15/027* (2013.01)

USPC .................................. 340/438; 340/425.5

(58) Field of Classification Search
None
See application file for complete search history.

(56) References Cited

U.S. PATENT DOCUMENTS

| 5,555,503 | A | * | 9/1996 | Kyrtsos et al. ............... 701/518 |
| 5,684,696 | A | * | 11/1997 | Rao et al. ..................... 701/25 |
| 7,894,951 | B2 | * | 2/2011 | Norris et al. .................. 701/36 |
| 2007/0198145 | A1 | * | 8/2007 | Norris et al. .................. 701/23 |
| 2011/0071718 | A1 | * | 3/2011 | Norris et al. .................. 701/23 |

* cited by examiner

*Primary Examiner* — Travis Hunnings
(74) *Attorney, Agent, or Firm* — Mickki D. Murray; Parks Wood LLC

(57) ABSTRACT

Systems and methods for switching between manual-mode steering and autonomous-mode steering, including a steering wheel assembly sending a signal to an autonomous driving electronic control unit, to engage autonomous-mode steering, in response to an autonomous interface steering wheel of the assembly having been moved from a first position to a second position.

16 Claims, 4 Drawing Sheets

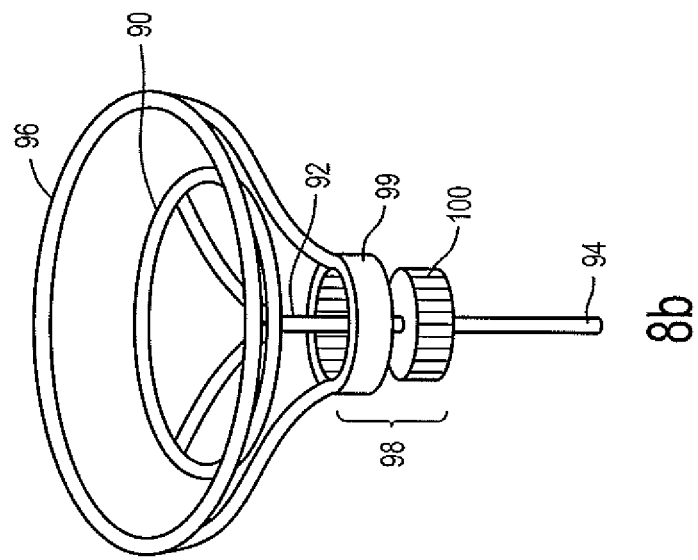
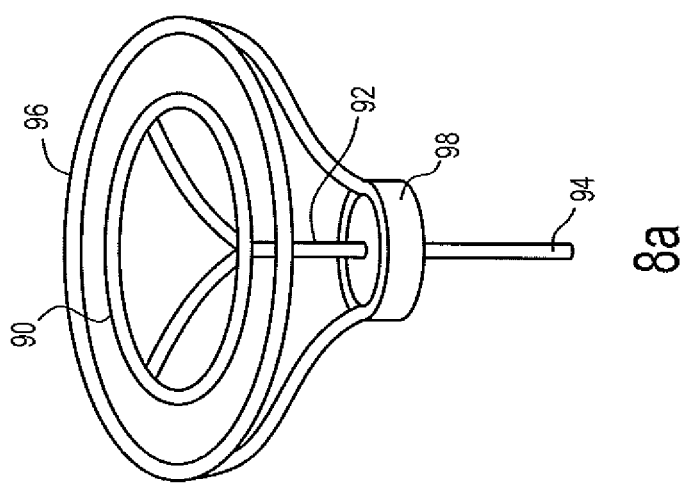
FIG. 8

STEERING WHEELS FOR VEHICLE CONTROL IN MANUAL AND AUTONOMOUS DRIVING

TECHNICAL FIELD

The technical field relates generally to systems and methods for steering a vehicle and, more specifically, to systems and methods for switching between manual and autonomous steering modes.

BACKGROUND

There are presently several problematic issues for vehicles incorporating semi-autonomous and fully autonomous driving systems. One issue with many systems is that the classic steering wheel rotates vigorously while the vehicle is in autonomous mode. This can be distracting and cause confusion for the driver. Another issue is that the transition from vehicle controlled steering (autonomous mode) to driver controlled steering (manual mode) is difficult. There is at present no clear and easy way for a driver to assume manual control or allow autonomous control. There is no clear interface for switching between manual and autonomous steering modes.

SUMMARY

The present invention is directed to systems and methods for transfer between manual mode steering and autonomous mode steering. The systems and methods provide a clear distinction between the two modes and natural control of the vehicle while in autonomous or manual mode. In particular, the present invention is a vehicle steering system for use in a vehicle operable in a manual steering mode and an autonomous steering mode. The vehicle includes a steering wheel assembly having an autonomous steering wheel and includes an autonomous driving electronic control unit (ECU). The autonomous steering wheel is moveable from a first position to a second position which sends a signal to the autonomous driving ECU and engages the autonomous driving ECU.

When the driver wants to override automatic steering and take control of the vehicle, grasping the steering wheel is one way for the driver to commandeer control of the vehicle. In addition, the steering wheel can be the means to transfer control of the vehicle to an autonomous steering system. It is thus desirable to use the steering wheel as the interface between manual and autonomous modes.

The systems and methods involve the use of a vehicle steering system wherein a steering wheel is moved from a first plane into a second plane to shift the vehicle steering to autonomous mode and the wheel is moved back into the first plane to change the steering mode back to manual.

In one embodiment, a single steering wheel is employed. When the wheel is in a first plane it functions as a standard manual steering wheel. Pulling or pushing the wheel towards or away from the driver initiates autonomous mode. Manual steering mode can be reasserted by moving the steering wheel into the original position.

In a second embodiment, a double steering wheel assembly is employed, where the two wheels are concentric. One wheel, preferably the inner wheel, is a standard manual steering wheel, while the other wheel is the interface with the autonomous steering system. When the wheels are in the same plane, the wheels move together as a standard steering wheel in manual mode. Pulling or pushing the autonomous steering wheel towards or away from the driver into a second parallel plane however shifts the vehicle into autonomous mode. Pushing the wheel back into the first plane disengages autonomous mode.

According to one aspect of the invention, a steering wheel functions as the interface between manual and autonomous steering modes by engaging or disengaging an autonomous steering system, which is a part of an autonomous driving electronic control unit (ECU).

According to another aspect of the invention, a vehicle steering system comprises concentric double wheels which act together in manual mode when they are in the same plane and wherein an autonomous steering system is engaged when this wheel is moved from the first plane.

According to another aspect of the invention, a vehicle steering system comprises concentric double wheels where one wheel is symbolic (does not function to steer the vehicle as in the standard manual fashion) when pulled towards or pushed away from the driver out of the first plane.

According to another aspect of the invention, the inner wheel rotates according to the instructions of the autonomous driving ECU when the steering system is in autonomous mode.

According to another aspect of the invention, the autonomous steering wheel can be rotated while in autonomous mode to initiate certain maneuvers such as switching lanes.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 3 illustrates the movement of the dual wheel embodiment of the invention; FIGS. 3a and 3b show the steering wheels in manual mode and FIGS. 3c and 3d show the steering wheels in autonomous mode.

FIGS. 8a and 8b illustrate the dual steering wheel assembly in greater detail.

DETAILED DESCRIPTION

As required, detailed embodiments are disclosed herein. It must be understood that the disclosed embodiments are merely exemplary and may be embodied in various and alternative forms, and combinations thereof. As used herein, the word "exemplary" expansively refers to embodiments that serve as illustrations, specimens, models, or patterns. The figures are not necessarily to scale and some features may be exaggerated or minimized to show details of particular components. In other instances, well-known components, systems, materials, or methods being known to those of ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
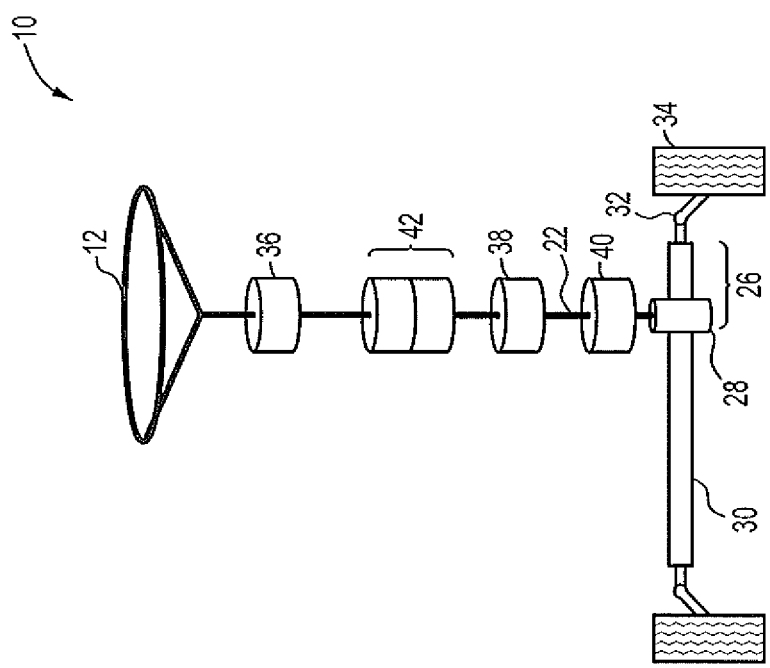
FIG. 1 is a diagram of a mechanical steering system.

FIG. 1 illustrates a manual steering system. A vehicle includes a steering system 10 including a steering wheel 12, a steering shaft 22, a rack-and-pinion 26, including pinion gear 28 and toothed rack 30, tie rods 32, wheels 34, steering wheel sensors 36, wheel sensors 38, and motor 40. The steering wheel 12 is connected to the steering shaft 22, which is connected to the rack-and-pinion 26 such that rotary motion of the steering wheel 12 is transferred to the rack-and-pinion 26. The pinion gear 28 converts the rotary motion into linear movement of the rack 30. The tie rods 32 connect the rack 30 to the wheels 34 and convert the movement of the rack 30 into rotation of the wheels 34.

FIG. 1 illustrates how a mechanical steering system of the invention operates in manual mode. The steering wheel 12 is connected to the steering system through a mechanical or electrical clutch mechanism. When the steering wheel is in the manual position, the clutch 42 is engaged and the steering wheel 12 communicates directly with the wheels 34. The clutch 42 can be mechanical or electrical.

Figure 2:
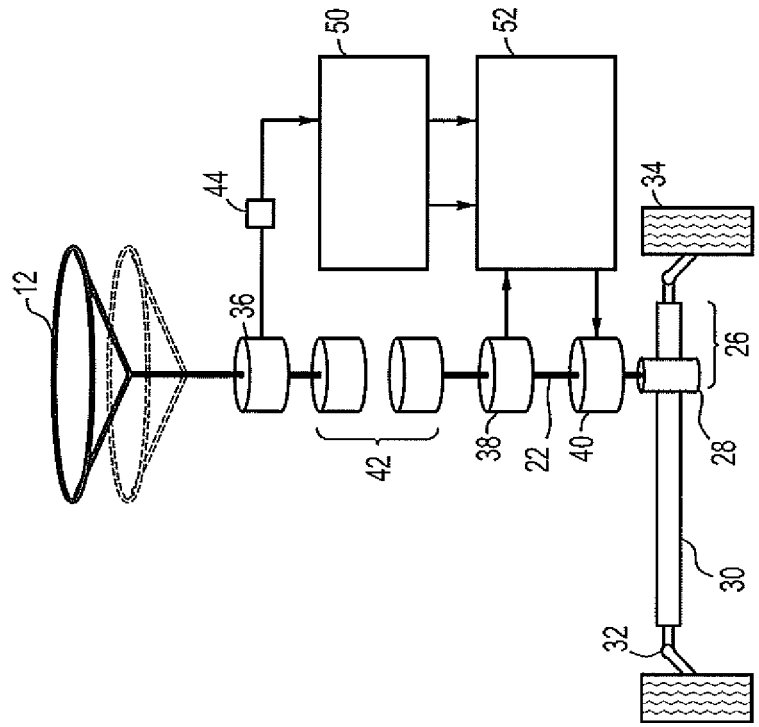
FIG. 2 is a diagram of a mechanical steering system according to one embodiment of the invention where the autonomous steering system is engaged.

FIG. 2 illustrates a mechanical steering system of the invention in autonomous mode. Steering wheel 12 has been pulled upwards, towards the driver (not shown). This disengages the clutch 42, disrupts the mechanical connection between the steering wheel 12 and the wheels 34, and engages the autonomous driving ECU (electronic control unit) 50. A sensor 44 senses the movement of the steering wheel 12 and signals the autonomous driving ECU to initiate autonomous steering. The autonomous driving ECU 50 provides instructions to a steer-by-wire ECU 52 which receives signals from wheel sensors 38 and provides information to motor 40. The autonomous driving ECU 50 includes components of an autonomous steering system as well as other aspects of autonomous driving.

FIG. 2 shows steering wheel 12 as a single wheel but it can alternatively be a double wheel. FIG. 3 illustrates a double steering wheel assembly 14. In the double wheel embodiment, in manual mode, both wheels 16 and 18 move together and act as a standard steering wheel. In autonomous mode the inner wheel 16 rotates according to the instructions of the autonomous driving ECU while the outer wheel 18 is fixed. The driver can put his or her hands on the wheel but this is not essential.

The steering wheel assembly can be configured in a variety of ways to connect the manual steering wheel to the manual steering system and allow the autonomous steering wheel 12 or 18 to disengage from the manual steering system and engage the autonomous steering mode. In one embodiment of the double wheel configuration, shown in FIGS. 8a and 8b, the manual steering wheel 90 has a central stem 92 that connects with the steering shaft 94. IN some embodiments, the autonomous steering wheel 96 connects to the manual steering wheel 90 with a clutch mechanism 98. When the autonomous steering wheel 96 is pulled upwards as shown in FIG. 8b, the clutch 98 disengages into clutch parts 98, 100 and a sensor (not shown) sends a signal to the autonomous driving ECU (not shown) causing it to activate. Pushing the autonomous steering wheel 96 down to its original position reengages the clutch 98 and the sensor (not shown) sends a signal disengaging the autonomous driving ECU (not shown).

FIG. 3a shows the steering wheel assembly 14 in manual mode, where inner wheel 16 and outer wheel 18 are in the same plane. FIG. 3b illustrates the wheels 16, 18 in manual mode from a side view.

FIGS. 3c and 3d illustrate steering wheel assembly 14 in autonomous mode. The outer steering wheel 18 has been pulled towards the driver, out of the initial plane still defined by inner steering wheel 16. The outer steering wheel 18 preferably moves a maximum of about 10 cm, more preferably about 1 to 5 cm.

Figure 4:
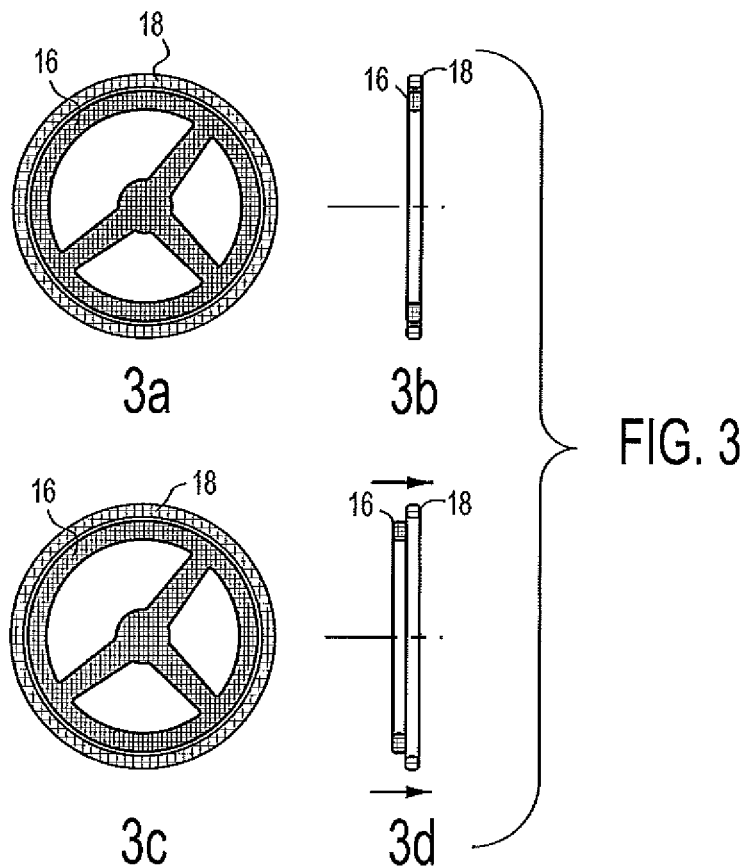
FIG. 4 illustrates one aspect of the invention where the steering wheel in autonomous mode can be used to initiate certain maneuvers.

As illustrated by FIG. 4, the outer steering wheel 18 can be used to control the vehicle in some respects while the vehicle is in autonomous mode. Turning the steering wheel can provide a signal to the autonomous driving ECU 50 to perform a certain maneuver. This signal can be given by rotating the wheel 18 in a direction by a particular degree. This aspect of the invention can also be employed in the single wheel embodiment. The rotation of the autonomous interface wheel (18 or 12) can be minimal, 5°-20° for example, similar to the rotation of the turn signal knob. A haptic feedback ("click") can be used to give the driver mechanical feedback that the command was received. In an exemplary embodiment, more than one "click" is employed, for example, one "click" at a turn of 5° and another "click" at a turn of 10°, in order to indicate two levels of commands. The first level may be smaller in scale or may be delayed in time, while the second level (requiring two "clicks") indicates a request for an immediate action or a larger scale of motion.

This aspect of the invention can also be implemented using continuous turning; in other words instead of step-wise turning of the wheel 18, 12, demonstrated by haptic feedback, the desired command to the autonomous driving ECU 50 is initiated simply by the degree of rotation of the wheel 18, 12. Other types of feedback can be used instead of or in addition to haptic feedback, such as auditory feedback, for example.

In contemplated embodiments, the system is configured to allow the driver to indicate various action levels in other ways, such as by moving the wheel to a position and holding it there for a certain amount of time. For instance, the driver could move the steering wheel to a 5° position, and receive feedback indicating the first level is established, and hold the steering wheel at the 5° position for two seconds indicating the driver's desire to command the second level, and receive feedback indicating the second level is established. The system may provide a hard stop for the steering wheel so that it stops at the required position for instituting the various levels.

As another example, the system could be configured so that the driver initiates the first level by a first action, such as turning the wheel to the 5° position, and initiates the second level by repeating the first action, and receive feedback in response to one or each action. Again, the system may provide a hard stop for the steering wheel so that it stops at the required position (e.g., the 5° position).

It is also contemplated that the system may, in any of the mentioned embodiments, provide to the steering wheel some bias, such as spring force, biasing the wheel toward a position, such as a home position (e.g., a 0° position). Such a bias has benefits including improving feel for the driver and facilitating moving toward the home position after the first action to allow the driver to make a distinct second action.

It may be desirable to use some sort of safety mechanism on steering wheel 18, 12 to prevent accidental rotation by the driver, such as some sort of initial resistance to turning of the steering wheel 18, 12 that must be overcome to allow momentary overriding of the autonomous mode.

Examples of maneuvers that the vehicle can be signaled to perform while in autonomous mode include lane changes, turns, roadway exits, and parking. To elaborate, maneuvers include:

Lane change request: the vehicle is driving autonomously, and the driver wishes to change lanes. A slight turn of the outer wheel 18 or 12 (one "click") in the desired direction will send the message to the autonomous driving ECU 50, and the command will be executed when the autonomous driving ECU 50 decides it is safe to do so.

"Turn here" command: the vehicle is driving autonomously, and the driver wishes to turn at the nearest junction or exit the highway at the nearest exit. A larger turn of the outer wheel 18 (two "clicks") in the desired direction will send the message to the autonomous driving ECU 50. The command will be executed when the autonomous driving ECU 50 decides it is safe to do so, but a higher degree of urgency will be communicated to the path planning module, forcing the vehicle to turn or exit as required.

Automatic parking after manual spot search ("park here" command): the driver will pass the parking spot, stop, shift into reverse, pull the outer wheel and turn it in the desired direction. The vehicle will then switch to autonomous driving mode, and the autonomous driving ECU will perform the required parking maneuver.

When the driver wishes to disengage the autonomous mode and regain control of the vehicle, he or she pushes the outer wheel 18 back into the plane of the inner wheel 16, and both wheels now move together, acting as a standard manual steering wheel. The switch between the driving modes can be controlled, allowing the switch only when certain conditions are met. The conditions may depend on the vehicle state, the driver state, or on environmental conditions.

Examples of limitations on switch from autonomous to manual mode, or vice versa, relevant to both the single and double wheel embodiments include:

Switch from manual to autonomous mode may not be allowed if the vehicle is operating outside some envelope (e.g., while turning or when outside some speed limits), when the vehicle's health monitoring system indicates that some sensors are not operating properly, or in certain environmental conditions (e.g., dense urban area or heavy snow).

Switch from autonomous to manual mode may be allowed only if the driver is using both hands and is looking forward.

In one embodiment, the wheels 16, 18 are color coded indicating manual or autonomous mode. For example, in manual mode both wheels 16, 18 could be the same color but in autonomous mode one of the wheels could be a different color, using light-emitting diodes (LEDs) or a color-changing material on the wheel or inside the wheel for example. The color-changing material could be configured to change in response to, for example, an electrical charge provided to it from, for instance, the autonomous driving ECU. In another embodiment, the system is configured to selectively illuminate one or both wheels 16, 18 to indicate whether the vehicle is operating in the manual or autonomous mode.

Similarly, in the single wheel embodiment, the wheel 12 could be one color when in manual mode and a different color when in autonomous mode.

Figure 5:
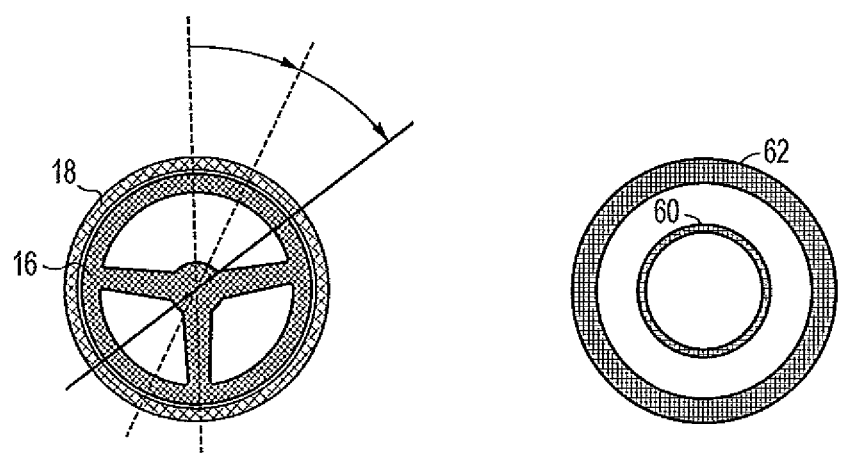
FIG. 5 illustrates another embodiment of the dual steering wheel assembly.

FIG. 5 illustrates a second embodiment of the double wheel embodiment of the invention. In this embodiment, inner wheel 60 is the autonomous mode interface and outer steering wheel 62 is used in manual steering mode. The wheels 60, 62 are still concentric as in the embodiments described above, but are spaced apart. In the manual mode, when wheels 60, 62 are in the same plane, the driver has his or her hands only on outer wheel 62 instead of wrapped around both wheels 60, 62. The wheels 60, 62 are spaced apart by an inch or more. This embodiment has the advantage that the driver will not get his or her fingers caught between the wheels 60, 62 when pushing or pulling autonomous wheel 60.

In this embodiment, as well as the one described above where the two wheels are adjacent, either wheel can be the autonomous mode interface and can be moved to engage and disengage autonomous mode.

Figure 7:
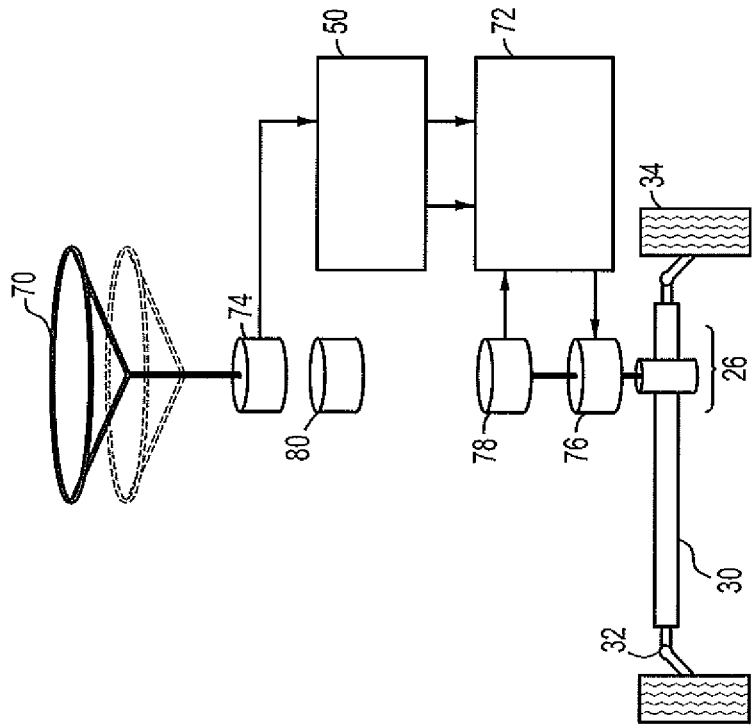
FIG. 7 is a diagram of a steer-by-wire steering system according to one embodiment of the invention where an autonomous steering system is engaged.
Figure 6:
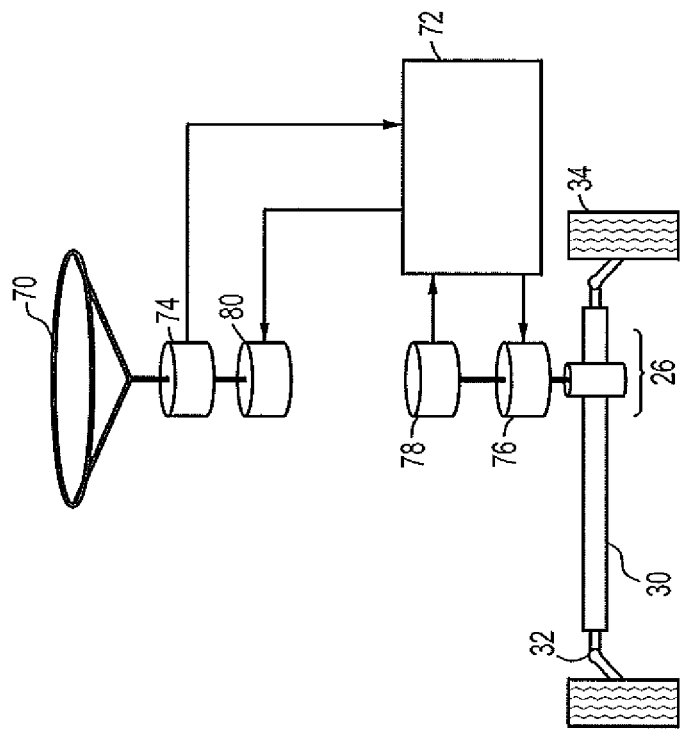
FIG. 6 is a diagram of a steer-by-wire manual steering system.

FIG. 6 illustrates a vehicle having a steer-by-wire steering system rather than mechanical steering as in FIGS. 1 and 2. FIG. 7 illustrates the present invention employed in a vehicle in autonomous steering mode having steer-by-wire steering.

Several aspects of the steer-by-wire system are the same as in the mechanical steering system of FIG. 1. However, instead of steering wheel 70 being directly mechanically connected to rack-and-pinion 26, tie rods 32, and wheels 34, it is connected to these elements through a steer-by-wire ECU 72. Steering wheel sensors 74 detect the movement of the steering wheel 70 and transmit that command to the steer-by-wire ECU 72, which then delivers the command to the steering motor 76 which controls the rack and pinion 26. Wheel sensors 78 deliver signals regarding wheels 34 movement to the steer-by-wire ECU 72 which delivers these signals to the feedback motor 80 which then moves the steering wheel 70 to provide feedback to the driver (similarly to the feedback provided by the wheels in a manual steering vehicle). The embodiment of FIG. 7 operates in this prior art embodiment when the vehicle is in manual mode.

As shown in FIG. 7, in the autonomous mode of steer-by-wire vehicle steering, the feedback motor 80 is bypassed when the steering wheel 70 is pulled towards the driver (not shown) to activate autonomous steering mode. Signals are sent from sensors 74 to the autonomous driving ECU 50, which directs the steer-by-wire ECU 72. The steer-by-wire ECU 72 communicates with the motor 76 and wheel sensors 78 similarly to the manual mode of FIG. 6, but does so in a closed loop rather than communicating back to the feedback motor 80, sensors 74, and steering wheel 70 as in the manual mode. The embodiment of FIG. 7 can otherwise be the same as any one or more of the embodiments disclosed in connection with FIGS. 2-5. For instance, the steer-by-wire embodiment of FIG. 6 could be implemented with a double steering wheel and associated functions disclosed herein.

The above described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A vehicle steering system for use in a vehicle operable in a manual steering mode and an autonomous steering mode, comprising:

an autonomous interface steering wheel movable from a first position to a second position; and an autonomous driving electronic control unit configured to receive a signal indicating that the autonomous interface steering wheel has been moved from the first position to the second position and initiate change of operation of the vehicle between the manual steering mode and the autonomous steering mode in response to receiving the signal;

wherein the first position of the autonomous interface steering wheel corresponds to a first plane and the second position of the autonomous interface steering wheel corresponds to a second plane being parallel to the first plane.

2. The vehicle steering system of claim 1 further comprising a manual steering wheel concentrically located to the autonomous interface steering wheel, and wherein the vehicle operates in manual steering mode when the manual steering wheel and the autonomous interface steering wheel are in the same plane and the vehicle operates in autonomous steering mode when the manual steering wheel and the autonomous interface steering wheel are in different planes.

3. The vehicle steering system of claim 1 wherein the second plane is closer to a driver of the vehicle during operation of the vehicle and movement of the autonomous steering wheel into the second plane signals the autonomous driving electronic control unit to initiate change of operation to autonomous steering mode.

4. The vehicle steering system of claim 1 wherein the autonomous interface steering wheel is configured to send a second signal to the autonomous driving electronic control unit when it is rotated a certain degree of rotation and the autonomous driving electronic control unit is configured to initiate a vehicle maneuver in response to receiving the second signal.

5. The vehicle steering system of claim 4 wherein the degree of rotation of the autonomous interface steering wheel determines the vehicle maneuver that is initiated by the electronic control unit.

6. A vehicle steering system for use in a vehicle operable in a manual steering mode and an autonomous steering mode, comprising:
 a steering wheel assembly movable between a first position and a second position;
 a sensor configured to detect movement of the steering wheel assembly between the first position and the second position and initiate transmission of a first signal to an autonomous driving electronic control unit, in response to detecting the movement, for changing operation of the vehicle between the manual steering mode and the autonomous steering mode;
 further comprising the autonomous driving electronic control unit being configured to receive the first signal indicating that the steering wheel assembly has been moved from the first position to the second position and initiate change of operation of the vehicle between the manual steering mode and the autonomous steering mode in response to receiving the first signal; and wherein
 the steering wheel assembly is configured to, in response to receiving, while the vehicle is operating in the autonomous steering mode, input from a driver of the vehicle indicating that the driver would like the vehicle to execute a particular vehicle maneuver, communicate a second signal to the electronic control unit indicating the input; and
 the electronic control unit is configured to initiate performance of the particular vehicle maneuver in response to receiving the second signal.

7. The vehicle steering system of claim 6 wherein the steering wheel assembly comprises an autonomous interface steering wheel and a manual steering wheel and the autonomous interface steering wheel is moveable from a first position to a second position.

8. The vehicle steering system of claim 7 wherein the autonomous interface steering wheel and the manual steering wheel are concentrically arranged with the manual steering wheel concentrically inside of the autonomous interface steering wheel.

9. A method, of vehicle operation, comprising:
 receiving, at an autonomous driving electronic control unit, a signal from an autonomous steering wheel assembly including an autonomous interface steering wheel, the signal indicating that the autonomous interface steering wheel has been moved from a first position to a second position; and
 the autonomous driving electronic control unit initiating change of operation of the vehicle between a manual steering mode and an autonomous steering mode in response to receiving the signal; and
 providing feedback to the driver in connection with autonomous operation of the vehicle, the feedback being selected from a group consisting of:
  haptic feedback, by way of the steering wheel assembly; and
  visual feedback, by way of the steering wheel assembly.

10. The method of claim 9 further comprising the autonomous interface steering wheel assembly sending the signal to the autonomous driving electronic control unit in response to the autonomous interface steering wheel having been moved by a driver of the vehicle between the first position and the second position.

11. A vehicle steering system for use in a vehicle operable in a manual steering mode and an autonomous steering mode, comprising:
 an autonomous interface steering wheel movable from a first position to a second position; and
 an autonomous driving electronic control unit configured to receive a first signal indicating that the autonomous interface steering wheel has been moved from the first position to the second position and initiate change of operation of the vehicle between the manual steering mode and the autonomous steering mode in response to receiving the first signal;
 wherein the autonomous interface steering wheel is configured to send a second signal to the autonomous driving electronic control unit when it is rotated a certain degree of rotation and the autonomous driving electronic control unit is configured to initiate a vehicle maneuver in response to receiving the second signal; and
 wherein the autonomous interface steering wheel and autonomous driving electronic control unit are configured to provide haptic feedback to the driver in response to the autonomous interface steering wheel being rotated the certain degree of rotation while the vehicle is in the autonomous steering mode.

12. A vehicle steering system for use in a vehicle operable in a manual steering mode and an autonomous steering mode, comprising:
 an autonomous interface steering wheel movable from a first position to a second position; and
 an autonomous driving electronic control unit configured to receive a first signal indicating that the autonomous interface steering wheel has been moved from the first position to the second position and initiate change of operation of the vehicle between the manual steering mode and the autonomous steering mode in response to receiving the first signal;
 wherein the autonomous interface steering wheel is configured to send a second signal to the autonomous driving electronic control unit when it is rotated a certain degree of rotation and the autonomous driving electronic control unit is configured to initiate a vehicle maneuver in response to receiving the second signal; and wherein the maneuver is selected from a group of maneuvers consisting of lane change, turn, roadway exit, and parking.

13. A vehicle steering system for use in a vehicle operable in a manual steering mode and an autonomous steering mode, comprising:

an autonomous interface steering wheel movable from a first position to a second position; and an autonomous driving electronic control unit configured to receive a signal indicating that the autonomous interface steering wheel has been moved from the first position to the second position and initiate change of operation of the vehicle between the manual steering mode and the autonomous steering mode in response to receiving the signal; and wherein the autonomous driving electronic control unit is configured to consider at least one other variable, in addition to the signal, in determining to initiate change of vehicle operation between the manual steering mode and the autonomous steering mode.

14. A vehicle steering system for use in a vehicle operable in a manual steering mode and an autonomous steering mode, comprising:

an autonomous interface steering wheel movable from a first position to a second position; and an autonomous driving electronic control unit configured to receive a signal indicating that the autonomous interface steering wheel has been moved from the first position to the second position and initiate change of operation of the vehicle between the manual steering mode and the autonomous steering mode in response to receiving the signal;

wherein the autonomous interface steering wheel is configured to change in visual appearance to indicate a change between the autonomous steering mode and the manual steering mode.

15. A vehicle steering system for use in a vehicle operable in a manual steering mode and an autonomous steering mode, comprising:

a steering wheel assembly movable between a first position and a second position; and a sensor configured to detect movement of the steering wheel assembly between the first position and the second position and initiate transmission of a first signal to an autonomous driving electronic control unit, in response to detecting the movement, for changing operation of the vehicle between the manual steering mode and the autonomous steering mode;

wherein a face of the steering wheel assembly in the first position corresponds to a first plane and a face of the steering wheel assembly in the second position corresponds to a second plane being parallel to the first plane.

16. A vehicle steering system for use in a vehicle operable in a manual steering mode and an autonomous steering mode, comprising:

a steering wheel assembly movable between a first position and a second position; and a sensor configured to detect movement of the steering wheel assembly between the first position and the second position and initiate transmission of a first signal to an autonomous driving electronic control unit, in response to detecting the movement, for changing operation of the vehicle between the manual steering mode and the autonomous steering mode;

wherein the steering wheel assembly is configured to change in visual appearance in response to movement of the steering wheel assembly between the first position and the second position.

* * * * *